(12) United States Patent
Backholm

(10) Patent No.: US 9,001,746 B2
(45) Date of Patent: *Apr. 7, 2015

(54) NETWORK-INITIATED DATA TRANSFER IN A MOBILE NETWORK

(75) Inventor: Ari Backholm, Espoo (FI)

(73) Assignee: Seven Networks, Inc., San Carlos, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/860,419

(22) Filed: Aug. 20, 2010

(65) Prior Publication Data

US 2011/0047232 A1    Feb. 24, 2011

Related U.S. Application Data

(63) Continuation of application No. 11/471,704, filed on Jun. 21, 2006, now Pat. No. 7,904,101.

(60) Provisional application No. 60/707,171, filed on Aug. 11, 2005.

(30) Foreign Application Priority Data

Jun. 21, 2005   (FI) ..................................... 20055332

(51) Int. Cl.
*H04W 4/00*     (2009.01)
*H04W 76/02*    (2009.01)
*H04M 7/12*     (2006.01)
*H04W 76/04*    (2009.01)
(Continued)

(52) U.S. Cl.
CPC ............ *H04W 76/02* (2013.01); *H04M 7/1205* (2013.01); *H04W 76/045* (2013.01); *H04W 76/068* (2013.01); *H04W 80/04* (2013.01); *H04L 67/14* (2013.01)

(58) Field of Classification Search
USPC ........................................................ 455/510
See application file for complete search history.

(56) References Cited

U.S. PATENT DOCUMENTS 4,831,582 A   5/1989   Miller et al.
4,875,159 A   10/1989  Cary et al.
(Continued)

FOREIGN PATENT DOCUMENTS

EP   1107519 A2   6/2001
EP   1361765 A1   11/2003
(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — German J Viana Di Prisco
(74) *Attorney, Agent, or Firm* — NKK Patent Law, PLLC

(57) ABSTRACT

A method for IP [=Internet Protocol] communication to/from a mobile terminal via a network element in a mobile network. The mobile terminal uses an in-band trigger for establishing an IP connection. The network element uses an out-band trigger (3-8) for initiating IP connection establishment. The mobile terminal responding to the out-band trigger by using an in-band trigger for establishing the IP connection (3-10). After the data transfer (3-12), the mobile terminal and the network element maintain the IP connection for a predetermined time after the latest transaction (3-14).

16 Claims, 3 Drawing Sheets

(51) Int. Cl.
*H04L 29/08* (2006.01)
*H04W 76/06* (2009.01)
*H04W 80/04* (2009.01)

(56) References Cited

U.S. PATENT DOCUMENTS

| | | | |
|---|---|---|---|
| 4,897,781 A | 1/1990 | Chang et al. |
| 5,263,157 A | 11/1993 | Janis |
| 5,386,564 A | 1/1995 | Shearer et al. |
| 5,392,390 A | 2/1995 | Crozier |
| 5,572,643 A | 11/1996 | Judson |
| 5,581,749 A | 12/1996 | Hossain et al. |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,787,441 A | 7/1998 | Beckhardt |
| 5,790,425 A * | 8/1998 | Wagle | 709/218 |
| 5,790,790 A | 8/1998 | Smith et al. |
| 5,799,318 A | 8/1998 | Cardinal et al. |
| 5,832,483 A | 11/1998 | Barker |
| 5,857,201 A | 1/1999 | Wright, Jr. et al. |
| 5,870,759 A | 2/1999 | Bauer et al. |
| 5,881,055 A | 3/1999 | Kondo |
| 5,909,689 A | 6/1999 | Van Ryzin |
| 5,943,676 A | 8/1999 | Boothby |
| 5,961,590 A | 10/1999 | Mendez et al. |
| 5,968,131 A | 10/1999 | Mendez et al. |
| 5,978,933 A * | 11/1999 | Wyld et al. | 714/13 |
| 6,006,259 A | 12/1999 | Adelman et al. |
| 6,006,274 A | 12/1999 | Hawkins et al. |
| 6,023,708 A | 2/2000 | Mendez et al. |
| 6,044,381 A | 3/2000 | Boothby et al. |
| 6,085,192 A | 7/2000 | Mendez et al. |
| 6,131,096 A | 10/2000 | Ng et al. |
| 6,131,116 A | 10/2000 | Riggins et al. |
| 6,138,124 A | 10/2000 | Beckhardt |
| 6,141,664 A | 10/2000 | Boothby |
| 6,151,606 A | 11/2000 | Mendez |
| 6,173,312 B1 * | 1/2001 | Atarashi et al. | 709/203 |
| 6,212,175 B1 | 4/2001 | Harsch |
| 6,212,529 B1 | 4/2001 | Boothby et al. |
| 6,223,187 B1 | 4/2001 | Boothby et al. |
| 6,233,341 B1 | 5/2001 | Riggins |
| 6,324,542 B1 | 11/2001 | Wright, Jr. et al. |
| 6,708,221 B1 | 3/2004 | Mendez et al. |
| 6,799,190 B1 | 9/2004 | Boothby |
| 6,925,477 B1 | 8/2005 | Champagne et al. |
| 7,139,565 B2 * | 11/2006 | Fiatal et al. | 455/423 |
| 7,430,609 B2 * | 9/2008 | Brown et al. | 709/231 |
| 7,634,558 B1 | 12/2009 | Mangal et al. |
| 7,774,007 B2 | 8/2010 | Backholm et al. |
| 7,904,101 B2 | 3/2011 | Backholm |
| 8,285,200 B2 | 10/2012 | Backholm et al. |
| 8,707,406 B2 * | 4/2014 | Tosey | 726/7 |
| 2002/0160812 A1 * | 10/2002 | Moshiri-Tafreshi et al. | 455/561 |
| 2003/0128676 A1 | 7/2003 | Lee |
| 2004/0120294 A1 | 6/2004 | Yang et al. |
| 2004/0176128 A1 * | 9/2004 | Grabelsky et al. | 455/553.1 |
| 2004/0230619 A1 * | 11/2004 | Blanco et al. | 707/200 |
| 2005/0015432 A1 * | 1/2005 | Cohen | 709/201 |
| 2005/0043999 A1 * | 2/2005 | Ji et al. | 705/21 |
| 2005/0086540 A1 | 4/2005 | Gunter et al. |
| 2005/0188098 A1 | 8/2005 | Dunk |
| 2005/0255886 A1 * | 11/2005 | Aaltonen et al. | 455/558 |
| 2005/0278641 A1 | 12/2005 | Mansour et al. |
| 2006/0048061 A1 | 3/2006 | Forlenza et al. |
| 2006/0063544 A1 * | 3/2006 | Zhao et al. | 455/510 |
| 2006/0123119 A1 | 6/2006 | Hill et al. |
| 2006/0190563 A1 * | 8/2006 | Vann | 709/219 |
| 2007/0019610 A1 | 1/2007 | Backholm et al. |
| 2007/0019611 A1 | 1/2007 | Backholm |
| 2011/0051610 A1 | 3/2011 | Backholm et al. |
| 2011/0134936 A1 | 6/2011 | Andreoli-Fang et al. |
| 2012/0008536 A1 | 1/2012 | Tervahauta et al. |
| 2013/0003634 A1 | 1/2013 | Backholm et al. |

FOREIGN PATENT DOCUMENTS

| | | |
|---|---|---|
| EP | 1569404 A1 | 8/2005 |
| FI | 118451 B1 | 11/2007 |
| FI | 119138 B1 | 7/2008 |
| WO | WO-98/24257 A1 | 6/1998 |
| WO | WO-00/78068 A1 | 12/2000 |
| WO | WO-03/067447 A1 | 8/2003 |
| WO | WO-03/098890 A1 | 11/2003 |
| WO | WO-2004/043092 A1 | 5/2004 |
| WO | WO-2004045171 A1 | 5/2004 |
| WO | WO-2005/024569 A2 | 3/2005 |
| WO | WO-2006/136660 A1 | 12/2006 |
| WO | WO-2006/136661 A1 | 12/2006 |

OTHER PUBLICATIONS

Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Blaney, Jeff, "You Can Take It With You—An Introduction to Mobile Computing With Notes R4," The View, vol. 2, Issue 1, 14 pages, Jan.-Feb. 1996.
Braden, R., "Requirements for Internet Hosts—Communication Layers," RFC 1122, Internet Engineering Task Force, 107 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
Dahl, Andrew, "Lotus Notes® 4 Administrator's Survival Guide," Sams Publishing, 64 pages, 1996.
Falkner, Mike, "How to Plan, Develop, and Implement Lotus Notes® in Your Organization," John Wiley & Sons, Inc., 539 ppages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.

(56) References Cited

OTHER PUBLICATIONS

Hajdu, Kalman et al., "Lotus Notes Release 4 in a Multiplatform Environment," IBM Corporation, 173 pages, Feb. 1996.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
IntelliLink Corporation, "IntelliLink® for Windows User's Guide," Version 3.0, 167 pages, 1994.
International Application No. PCT/FI2006/050271, International Search Report, 4 pages, Sep. 25, 2006.
International Application No. PCT/FI2006/050272, International Search Report, 3 pages, Sep. 21, 2006.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.

(56) References Cited

OTHER PUBLICATIONS

"Lotus Notes Advisor," Advisor Publications Inc., 63 pages, Dec. 1996.

"Lotus Notes—Notes Administration Help," Screen Shots, 17 pages, Published prior to Jan. 8, 2003.

Marmel, Elaine, "Easy Lotus® Notes Release 4.0," Que Corporation, 237 pages, 1996.

McMullen, Melanie, "Network Remote Access and Mobile Computing," Miller Freeman Inc., 226 pages, 1994.

Netscape Communications Corporation, "Netscape Mail Server Administrator's Guide," Version 2.0, 172 pages, 1996.

Netscape Communications Corporation, "Netscape Mail Server Installation Guide," Version 2.0 for Unix, 62 pages, 1996.

Netscape Communications Corporation, "Netscape Mail Server User's Guide," Version 2.0, 35 pages, 1996.

Netscape Communications Corporation, "Netscape News Server Administrator's Guide for Windows NT," Version 2.0, 119 pages, 1996.

"NotesPump 1.0 Release Notes," Publication Unknown, 8 pages, Published prior to Jan. 8, 2003.

Opyt, Barbara et al., "Use the Internet As Your Lotus Notes WAN," Lotus Notes Advisor, pp. 17-20, Nov.-Dec. 1996.

"Overview—What Is Lotus NotesPump?," Publication Unknown, 88 pages, Published prior to Jan. 8, 2003.

Pyle, Hugh, "The Architecture of Lotus Notes," Lotus Notes Advisor, Premiere Issue, pp. 18-27, 1995.

Pyle, Lisa, "A Jump Start to the Top Ten R3-To-R4 Migration Considerations," The View, vol. 1, Issue 5, 22 pages, Nov.-Dec. 1995.

Shafran, Andrew Bryce, "Easy Lotus® Notes for Windows™," Que Corporation, 199 pages, 1994.

Swedeen, Bret et al., "Under the Microscope—Domino Replication," LDD Today, 8 pages, Oct. 1, 1998.

Tamura, Randall A., "Lotus® Notes™ 4 Unleashed," Sams Publishing, 928 pages, 1996.

U.S. Appl. No. 11/296,255, Non-Final Office Action, 10 pages, Jan. 12, 2010.

U.S. Appl. No. 11/318,487, Final Office Action, 15 pages, Nov. 10, 2009.

Wainwright, Andrew, "Secrets to Running Lotus Notes: The Decisions No One Tells You How to Make," IBM Corporation, 193 pages, Oct. 1996.

Wilcox, Adam A., "PC Learning Labs Teaches Lotus Notes 3.0," Ziff-Davis Press, 381 pages, 1993.

Wong, Harry, "Casahl's Replic-Action: Delivering True Notes-DBMS Integration," The View, vol. 2, Issue 1, pp. 33-50, Jan.-Feb. 1996.

* cited by examiner

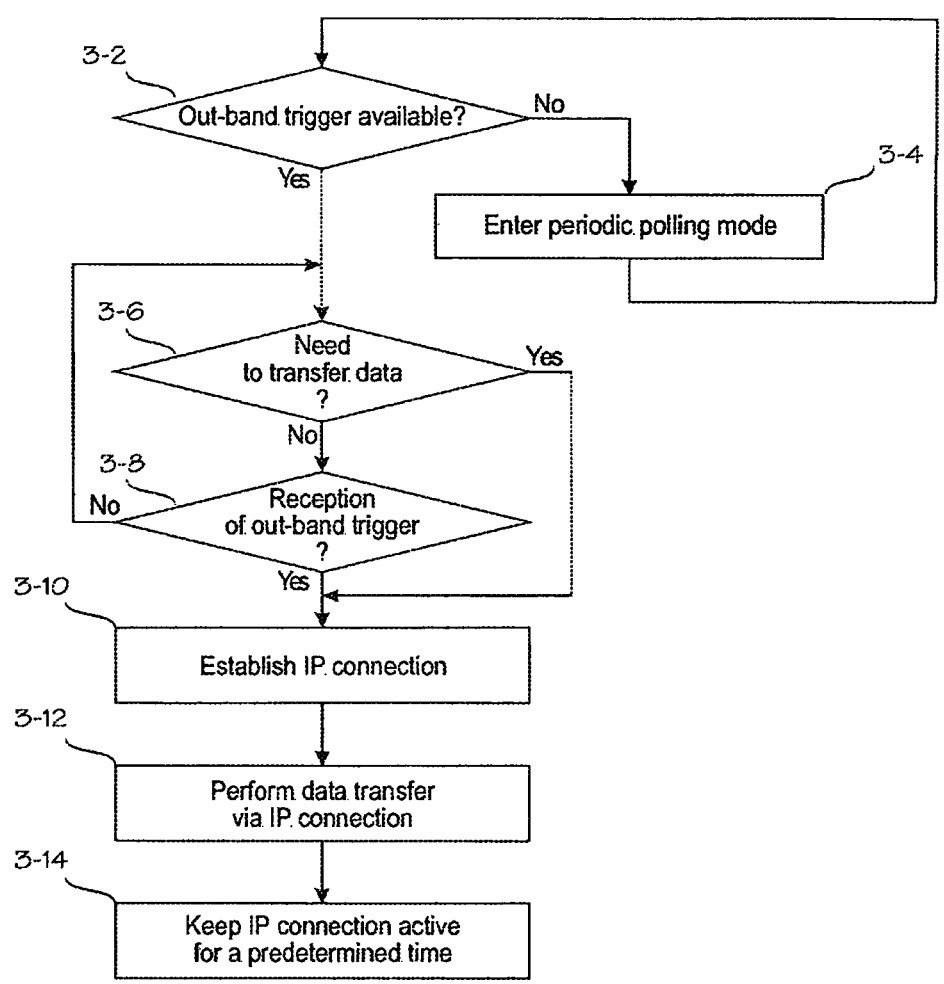

NETWORK-INITIATED DATA TRANSFER IN A MOBILE NETWORK

A. BACKGROUND OF THE INVENTION

The invention relates to techniques which are colloquially referred to as pushing data. Expressed more formally, the invention relates to methods, equipment and program products for network-initiated data transfer in a packet-switched mobile network.

In a packet-switched mobile network, a mobile terminal does is not normally assigned a dedicated circuit-switched connection. Instead, the network establishes and maintains a session for the terminal, and data packets are sent when necessary. In order to integrate mobile terminals with office applications, it is becoming increasingly popular to maintain Internet Protocol (IP) connections over packet data channels in packet-switched mobile networks. Maintaining an IP connection to/from a mobile terminal is desirable in order to keep data banks synchronized between the mobile terminal and an office computer, for example.

Maintaining an IP connection in packet-switched mobile networks involves certain problems, however. For example, it consumes the mobile terminal's battery. Further, many networks apply operator-defined policies to break connections after a certain period of inactivity. When the IP connection to/from the mobile terminal is disconnected, database synchronization is impossible before connection re-establishment. Connection re-establishment must be initiated from the mobile terminal's side, the network cannot initiate connection re-establishment.

But connection re-establishment involves further expenses in tariff and/or battery consumption. Yet further, since the network cannot initiate re-establishment of the IP connection, network-initiated data synchronization must be initiated by means of an out-band trigger, ie, signalling independent from the Internet Protocol. A short message service (SMS) and its derivatives are examples of theoretically suitable out-band triggering mechanisms. But a single GSM-compliant short message can only transfer approximately 160 characters, which means that it is impracticable to transfer actual data in the trigger message. This has the consequence that the subscriber must bear the expenses and delays in re-establishing the IP connection.

B. BRIEF DESCRIPTION OF THE INVENTION

An object of the present invention is to provide a method and an apparatus for implementing the method so as to alleviate the above disadvantages. The object of the invention is achieved by the methods and equipment which are characterized by what is stated in the independent claims. The dependent claims relate to specific embodiments of the invention.

The invention is based on the idea that a mobile terminal uses an in-band trigger for establishing an IP connection. The network element, when it needs to communicate with the mobile terminal, uses an existing IP connection if one is available; and if not, uses an out-band trigger for initiating the IP connection establishment. The mobile terminal responds to the out-band trigger by using an in-band trigger for establishing the IP connection. The IP connection is maintained for a predetermined time after the latest transaction (in either direction).

If no out-band trigger for initiating IP connection establishment is available, the mobile terminal enters a periodic polling mode, wherein it periodically sends inquires to or via the network element for data items to be synchronized.

An aspect of the invention is a method according to claim 1. Another aspect of the invention is a method according to claim 2. Other aspects of the invention relate to computer systems or program products for implementing the above methods.

C. BRIEF DESCRIPTION OF THE DRAWINGS

In the following the invention will be described in greater detail by means of specific embodiments with reference to the attached drawings, in which:

FIG. 3 shows a flowchart illustrating the principle of the invention as seen from the point of view of the mobile terminal.

D. DETAILED DESCRIPTION OF SPECIFIC EMBODIMENTS

The invention is applicable to virtually any mobile network architecture. The mobile network may be based on GPRS, 1×RTT or EVDO technologies, for example. The invention can also be implemented as part of a push-type mobile e-mail system, particularly in a consumer e-mail system, in which optimization of network resources is important because of the large number of users.

Figure 1:
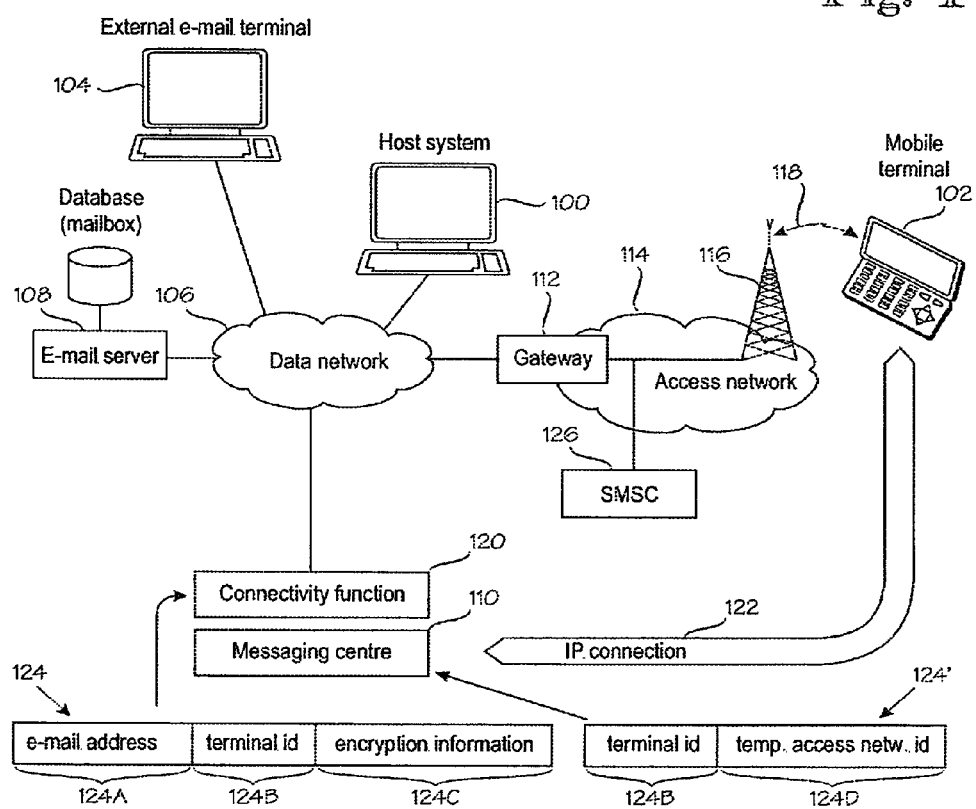
FIG. 1 shows an exemplary network arrangement in which the invention can be used.

FIG. 1 shows an exemplary system architecture which is supported by the owner of the present application. This system supports synchronization of e-mail messages and/or calendar items and/or other information between a host system and a mobile terminal.

Reference numeral 100 denotes a host system that is able to send an receive e-mail messages. Reference numeral 102 denotes a mobile terminal, also able to send an receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. There may be separate e-mail servers and/or server addresses for incoming and outgoing e-mail. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function 120, whose task is to push e-mail messages to the mobile terminal. In the embodiment shown in FIG. 1, the connectivity function 120 is considered a physically integral but logically distinct element of the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a IP connection 122 between the messaging centre 110 and the mobile terminal 102.

FIG. 1 shows an embodiment in which the messaging centre 110 is largely responsible for e-mail transport to/from the mobile terminal 102 via the access network 114, while a separate connectivity function 120 is responsible for data security issues. The connectivity function 120 may be physically attached to or co-located with the messaging centre 110, but they are logically separate elements. Indeed, a definite advantage of the separate connectivity function 120 is that it can be detached from the messaging centre, for instance, within the company that owns the host system 100 or the e-mail server 108. For a small number of users, the connectivity function 120 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 120 to support users who don't wish to install a separate connectivity function in a host system 100. For users who do install a separate connectivity function 120 in their host systems 100, such connectivity functions bypass the connectivity function in the messaging centre 110 and address the messaging centre 110 directly.

A real e-mail system supports a large number of mobile terminals 102 and IP connections 122. In order to keep track of which e-mail account and which IP connection belongs to which mobile terminal, the messaging centre 110 and the connectivity function collectively maintain an association 124, 124' for each supported mobile terminal. Basically, each association 124, 124' joins three fields, namely an e-mail address 124A assigned to the mobile terminal or its user, encryption information 124C and a temporary wireless identity 124D of the mobile terminal in the access network. The embodiment shown in FIG. 1 also employs a terminal identifier 124B which may be the same as the e-mail address 124A of the mobile terminal 102, in which case the association 124 actually associates three information items. Alternatively, the terminal identifier 124B may be an identifier arbitrarily assigned to the mobile terminal. In a preferred implementation the terminal identifier 124B is the mobile terminal's equipment identifier or its derivative. The encryption information 124C is preferably related to the mobile terminal's equipment identity and is preferably generated by the mobile terminal itself, so as to ensure that no other terminal besides the one used for creating the encryption information 124C will be able to decrypt incoming encrypted e-mail messages. The temporary wireless identity 124D may be the identifier of the IP connection 122 to the mobile station.

In the above-described system, the messaging centre 110 and connectivity function 120 were arranged to support a fairly large number of users of e-mail and/or calendar data. In order to satisfy the needs of the present invention, virtually any communication server able to maintain an IP connection to the mobile terminal can be used.

In order to provide out-band triggers, the network arrangement is operationally coupled to a network element able to communicate to the mobile terminal even in the absence of an IP connection. In the network arrangement shown in Figure, such a network element is embodied as a short message service centre (SMSC) 126. Because the IP connection cannot be initiated from the network side, the messaging centre 110 (or any other communication server) must request the mobile terminal 102 to establish the IP connection, for example when data needs to be synchronized between the mobile terminal and some other node, such as the host system 100. Such a request to establish the IP connection can be sent in the form of a connectionless message, such as a short message or one of its derivatives, for example, a multimedia message.

Figure 2:
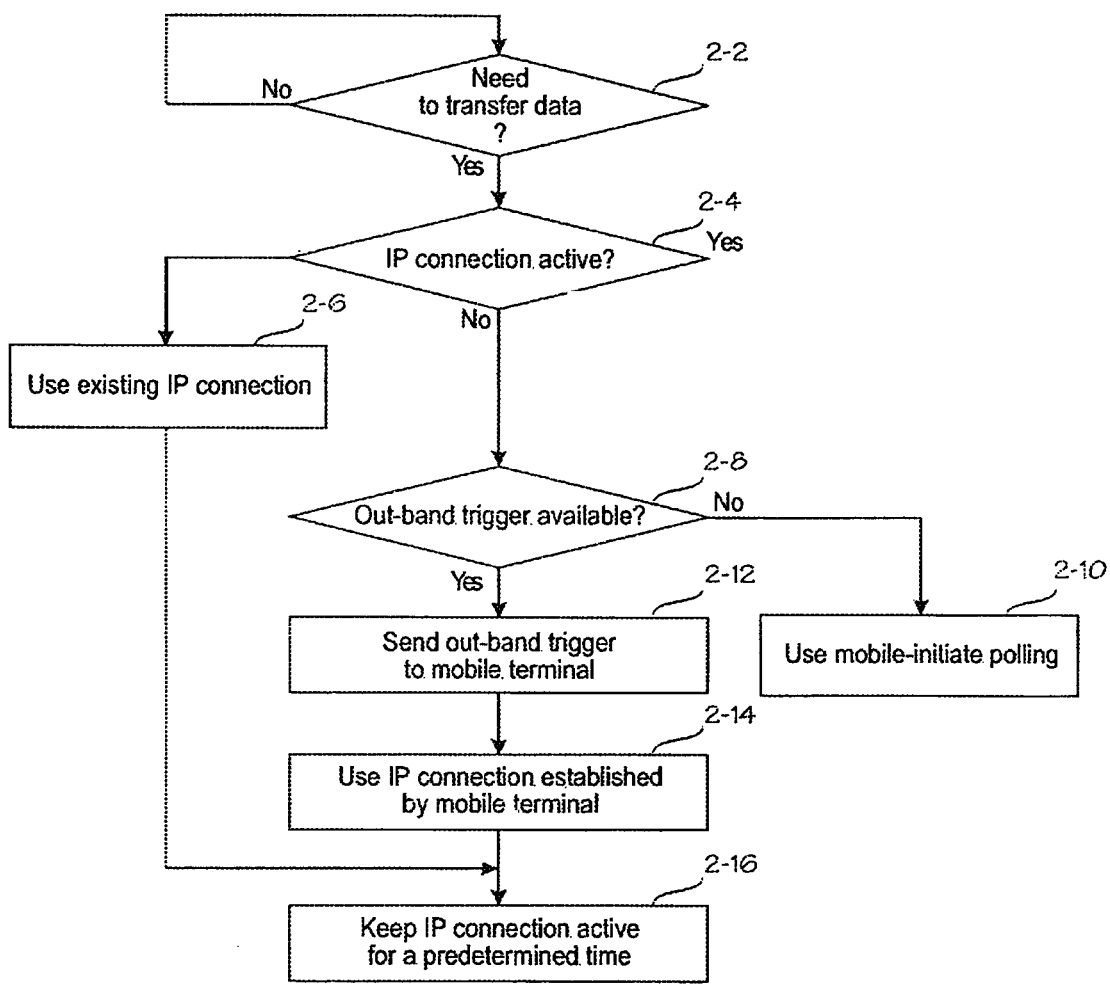
FIG. 2 shows a flowchart illustrating the principle of the invention as seen from the point of view of the network element.

FIG. 2 shows a flowchart illustrating the principle of the invention as seen from the point of view of a network element, such as the messaging centre 110 shown in FIG. 1, or some other element or server communicating with the mobile terminal. Step 2-2 is a loop in which the network element waits for a need to transfer data to the mobile terminal. In step 2-4 the network element determines if an IP connection to the mobile terminal is available. If yes, the IP connection will be used in step 2-6. After step 2-6 the process continues to step 2-16 in which the IP connection will be kept active for a predetermined time after, in order to avoid the expenses incurred in re-establishing a discontinued IP connection.

If no IP connection to the mobile terminal was not available in step 2-4, the process continues to step 2-8, in which the network element determines if an out-band triggering means, such as a short message service, is available. If not, the process continues to step 2-10, in which the network element resorts to mobile-initiated polling. In other words, the network element has no means to initiate IP connection establishment to the mobile terminal and must wait for inquiries from the mobile terminal. On the other hand, if an out-band triggering means, such as a short message service, is available, it will be used in step 2-12. In response to the trigger, the mobile terminal establishes an IP connection which the network element will use in 2-14, after which the process continues to step 2-16.

FIG. 3 shows a flowchart illustrating the principle of the invention as seen from the point of view of the mobile terminal. In step 3-2 the mobile terminal determines if an out-band triggering means is available. If not, the mobile terminal knows that the network element cannot request IP connection establishment, and in step 3-4 the mobile terminal enters a periodic polling mode, in which it periodically polls the network element for new information.

The mobile terminal makes the test in step 3-2 not for its own benefit but for the network element's, because the mobile terminal can always initiate IP connection establishment. But if no out-band triggering means is available, the mobile terminal knows that it cannot expect a request from the network element to establish an IP connection, which is why it should periodically poll the network element for new data.

When the system is in the periodic polling mode, at certain periodic intervals, the mobile terminal establishes an IP connection for inquiring the network element for new data, even if the mobile terminal itself has no data to send. If the network element has data to send, the IP connection is preferably kept active for a predetermined time after the latest data transfer. This procedure will be further described in connection with step 3-14.

In step 3-6, if the mobile terminal detects a need to transfer data, it proceeds to step 3-10 to establish an IP connection with the network element. Likewise, the IP connection establishment is initiated if in step 3-8 an out-band trigger is received from the network element. After the IP connection establishment in step 3-10, the mobile terminal transfers data in step 3-12, and in step 3-14 it keeps the IP connection active for a predetermined time after the latest transaction (in either direction).

In steps and 2-16 and 3-14, the IP connection is kept active for a predetermined time after the latest transaction (in either direction), in order to avoid the expenses in re-establishing a disconnected IP connection. This step can be implemented, for example, by means of two timers (physical or logical). Let us assume, for example, that the network disconnects IP connections after an inactivity period of 5 minutes. Let us further assume that, for the sake of economy and convenience, the IP connection will be maintained for 15 minutes after the latest transaction. After each transaction, both timers will be started. When the 5-minute timer expires, a keep-alive message is sent to the other party. A keep-alive message is a message sent for the purpose of preventing the network from disconnecting the IP connection. When the keep-alive message is sent, the 5-minute timer is again restarted, until the 15-minute timer expires, after which the keep-alive messages will no longer be sent.

It is readily apparent to a person skilled in the art that, as the technology advances, the inventive concept can be implemented in various ways. The invention and its embodiments are not limited to the examples described above but may vary within the scope of the claims.

The invention claimed is:

1. A method of transferring data from a network element to a mobile device, the method comprising:
   determining if there is a mechanism available to initiate an IP connection with the mobile device when no active IP connection is available between the network element and the mobile device;
   if the mechanism is available to initiate the IP connection with the mobile device when no active IP connection is available between the network element and the mobile device, causing an out of band trigger to be sent to the mobile device wherein the IP connection is established between the network element and the mobile device in response to the mobile device receiving the out of band trigger;
   if the mechanism is not available to initiate the IP connection with the mobile device when no active IP connection is available between the network element and the mobile device, establishing an IP connection with the mobile device in response to detecting a polling operation generated by the mobile device, wherein the polling operation generated by the mobile device initiates the IP connection;
   maintaining the IP connection for a predetermined amount of time, the maintaining including:
   initiating operation of a first timer, the first timer terminating its operation after a first timer period;
   initiating operation of a second timer, the second timer terminating its operation after a second timer period, wherein the second timer period is greater than the first timer period;
   (a) sending a keep alive message after expiration of the first timer period;
   (b) reinitiating the operation of the first timer;
   repeating (a) and (b) until expiration of the second timer period;
   wherein, the sending of a keep alive message is terminated after expiration of the second timer.

2. The method of claim 1, further comprising:
   transferring the data to the mobile device using the established IP connection; and maintaining the IP connection for an amount of time after transfer of data,
   the amount of time determined based on operator-defined policies.

3. The method of claim 1, wherein the first timer and the second timer are physical timers or logical timers.

4. The method of claim 1, wherein, the IP connection is maintained for a predetermined amount of time after the transfer of data, wherein the data includes email messages.

5. The method of claim 1, wherein the out of band trigger is sent via a short message service message to the mobile device.

6. The method of claim 1, wherein the IP connection is terminated after expiration of an amount of time that is greater than the second timer period and is equal to an integral number of first timer periods.

7. An apparatus for transferring data from a network element to a mobile device, the apparatus comprising:
   a processor;
   a data storage device coupled to the processor, the data storage device having instructions stored thereon;
   wherein the instructions, when executed by the processor, causes the apparatus to:
   determine if there is an active IP connection between the network element and the device;
   determine if there is a mechanism available for initiating an IP connection with the mobile device when no active IP connection is available;
   when the mechanism for initiating the IP connection is available and no active IP connection is available,
   direct an out of band trigger to be sent to the mobile device, and
   establish an IP connection between the network element and the mobile device in response to the mobile device receiving the out of band trigger, wherein the out of band trigger initiates the IP connection;
   when the mechanism for initiating the IP connection is not available and no active IP connection is available,
   establishing an IP connection between the network element and the mobile device in response to the network element detecting a polling operation from the mobile device,
   where the polling operation is generated by the mobile device to initiate the IP connection;
   maintain the IP connection for an amount of time after transfer of the data, determined from operator-defined policies;
   wherein maintaining the IP connection for the amount of time after transfer of the data comprises:
   initiating operation of a first timer, the first timer terminating its operation after a first timer period;

initiating operation of a second timer, the second timer terminating its operation after a second timer period, wherein the second timer period is greater than the first timer period; and terminating the IP connection after expiration of an amount of time that is greater than the second timer period and is equal to an integral number of first timer periods;
(a) send a keep alive message after expiration of the first timer period;
(b) reinitiate the operation of the first timer;
repeat (a) and (b) until expiration of the second timer period;
terminate sending of a keep alive message after expiration of the second timer; and
terminate the IP connection.

8. The apparatus of claim 7, wherein the instructions, executed by the processor, further causes the apparatus to:
transfer the data from the network element to the mobile device using the established IP connection.

9. The apparatus of claim 7, wherein the first timer and the second timer are physical timers.

10. The apparatus of claim 7, wherein the first timer and the second timer are logical timers.

11. The apparatus of claim 7, wherein directing an out of band trigger to be sent to the mobile device when a mechanism for initiating the IP connection is available comprises sending a short message service message to the mobile device.

12. The apparatus of claim 7, wherein the data is one or more mail messages.

13. The apparatus of claim 7, wherein directing an out of band trigger to be sent to the mobile device when a mechanism for initiating the IP connection is available comprises sending a multimedia message to the mobile device.

14. A method of transferring data from a network element to a mobile device, comprising:
determining if there is not a mechanism available to initiate an IP connection with the mobile device when no active IP connection is available between the network element and the mobile device;
wherein, if there is a mechanism available to initiate the IP connection with the mobile device and no active IP connection is available between the network element and the mobile device,
generating by the network element, an out of band trigger to initiate the IP connection, and
sending the out of band trigger to the mobile device to activate the IP connection with the mobile device
wherein, the out of band trigger generated by the network element initiates the IP connection; and
wherein, the IP connection is established between the network element and the mobile device in response to the mobile device receiving the out of band trigger;
wherein, if there is not a mechanism available to initiate the IP connection with the mobile device and no active IP connection is available between the network element and the mobile device,
establishing an IP connection between the network element and the mobile device in response to receiving a polling operation generated by the mobile device,
wherein, the polling operation is generated by the mobile device to initiate the IP connection;
maintaining the IP connection for an amount of time, determined based on operator-defined policies;
maintaining the IP connection for a predetermined amount of time, the maintaining including:
initiating operation of a first timer, the first timer terminating its operation after a first timer period;
initiating operation of a second timer, the second timer terminating its operation after a second timer period, wherein the second timer period is greater than the first timer period;
(a) sending a keep alive message after expiration of the first timer period;
(b) reinitiating the operation of the first timer;
repeating (a) and (b) until expiration of the second timer period;
wherein, the sending of a keep alive message is terminated after expiration of the second timer.

15. The method of claim 14, wherein the out of band trigger is sent via a short message service message to the mobile device.

16. A network element comprising:
one or more processors;
a memory unit having instructions stored thereon that, when executed by the one or more processors, cause the network element to:
determine if there is a mechanism available to initiate an IP connection with a mobile device when no active IP connection is available between the network element and the mobile device;
if the mechanism is available to initiate the IP connection with the mobile device when no active IP connection is available between the network element and the mobile device,
cause an out of band trigger to be sent to the mobile device,
wherein the IP connection is established between the network element and the mobile device in response to the mobile device receiving the out of band trigger;
if the mechanism is not available to initiate the IP connection with the mobile device when no active IP connection is available between the network element and the mobile device,
establish an IP connection with the mobile device in response to detecting a polling operation generated by the mobile device,
wherein the polling operation generated by the mobile device initiates the IP connection
wherein maintaining the IP connection for the amount of time after transfer of the data comprises:
initiating operation of a first timer, the first timer terminating its operation after a first timer period;
initiating operation of a second timer, the second timer terminating its operation after a second timer period, wherein the second timer period is greater than the first timer period; and terminating the IP connection after expiration of an amount of time that is greater than the second timer period and is equal to an integral number of first timer periods;
(a) send a keep alive message after expiration of the first timer period;
(b) reinitiate the operation of the first timer;
repeat (a) and (b) until expiration of the second timer period;
terminate sending of a keep alive message after expiration of the second timer; and
terminate the IP connection.

* * * * *